US007492236B2

(12) United States Patent

Ho et al.

(10) Patent No.: US 7,492,236 B2
(45) Date of Patent: Feb. 17, 2009

(54) GAIN COMPENSATION CIRCUIT

(75) Inventors: Yueh Lung Ho, China (TW); Te Hua Wu, China (TW)

(73) Assignee: Microelectronics Technology Inc., China (TW)

( * ) Notice: Subject to any disclaimer, the term of this patent is extended or adjusted under 35 U.S.C. 154(b) by 35 days.

(21) Appl. No.: 11/852,430

(22) Filed: Sep. 10, 2007

(65) Prior Publication Data

US 2008/0272864 A1 Nov. 6, 2008

(30) Foreign Application Priority Data

May 4, 2007 (TW) ............................. 96115805 A

(51) Int. Cl.
*H01P 1/22* (2006.01)
*H04B 1/38* (2006.01)

(52) U.S. Cl. ..................... 333/81 R; 330/310; 330/284; 330/289

(58) Field of Classification Search ............... 333/81 A, 333/81 R; 330/278, 289, 310, 272, 256, 330/266, 284
See application file for complete search history.

(56) References Cited

U.S. PATENT DOCUMENTS 6,418,301 B1 * 7/2002 Le et al. ....................... 455/73
7,133,651 B2 * 11/2006 Kwak ...................... 455/127.2

* cited by examiner

*Primary Examiner*—Stephen E Jones
(74) *Attorney, Agent, or Firm*—Connolly Bove Lodge & Hutz LLP; Myron K. Wyche

(57) ABSTRACT

A gain compensation circuit, applied to a microwave transceiver, includes a gain adjuster, a first attenuator and a second attenuator. The gain adjuster is disposed between a first amplifier and a filter for adjusting a nominal gain of the microwave transceiver. The first attenuator is disposed between the filter and a second amplifier for providing a first gain compensation. The second attenuator is electrically connected to the output of the second amplifier for providing a second gain compensation. The first and second gain compensations keep the gain of the microwave transceiver at a constant value under varying temperature conditions, and the first and second attenuators are used to reduce the degradation of return loss and noise figure of the microwave transceiver.

8 Claims, 4 Drawing Sheets

GAIN COMPENSATION CIRCUIT

BACKGROUND OF THE INVENTION

1. Field of the Invention

The present invention relates to a gain compensation circuit, and more particularly to a gain compensation circuit applied to an outdoor microwave transceiver.

2. Description of the Related Art

Generally, the gain of a normal transceiver will decrease at high temperatures (about 40° C. to 60° C.), but increase at low temperatures (below about 20° C.). Therefore, for some outdoor satellite transceivers which usually operate in suboptimal environmental conditions, unless gain compensation for varying temperature situations is considered, the gain of the transceiver will vary with the environmental temperature, causing signal distortion and deteriorating communication quality. Therefore, for such transceivers, it is common practice to design a compensation circuit which is able to suppress the gain of the transceiver at low temperatures but enhance the gain of the transceiver at high temperatures.

For the gain compensation of an outdoor transceiver, a passive attenuator cooperating with a thermistor is commonly used to act as a gain compensation mechanism of the transceiver. However, such structure will degrade the quality of noise figure of the transceiver due to gain attenuation. Another known method is to use the feature of a particular gain relating to temperature of an active amplifier to achieve the effect of gain compensation. However, this method has the drawback of a high material cost.

SUMMARY OF THE INVENTION

The present invention provides a gain compensation circuit which is applied in a microwave transceiver. The gain compensation circuit includes two passive attenuators each having a thermal resistor exhibiting a negative temperature coefficient, whereby the microwave transceiver obtains a constant gain even under various temperatures, increases gain compensation range and effectively improves degradation of noise figure.

The gain compensation circuit, applied to a microwave transceiver, in accordance with one embodiment of the present invention, comprises a gain adjuster, a first attenuator and a second attenuator. The gain adjuster is disposed between a first amplifier and a filter for adjusting a nominal gain of the microwave transceiver. The first attenuator is disposed between the filter and a second amplifier for providing a first gain compensation. The second attenuator is electrically connected to the output of the second amplifier for providing a second gain compensation. The first and second gain compensations keep the gain of the microwave transceiver at a constant value under different temperature conditions, and the first and second attenuators are used to reduce the degradation of return loss and noise figure of the microwave transceiver.

BRIEF DESCRIPTION OF THE DRAWINGS

The invention will be described according to the appended drawings in which:

FIG. 4(*b*) exemplifies a microwave receiver using the gain compensation circuit in accordance with one embodiment of the present invention.

PREFERRED EMBODIMENT OF THE PRESENT INVENTION

Figure 1:
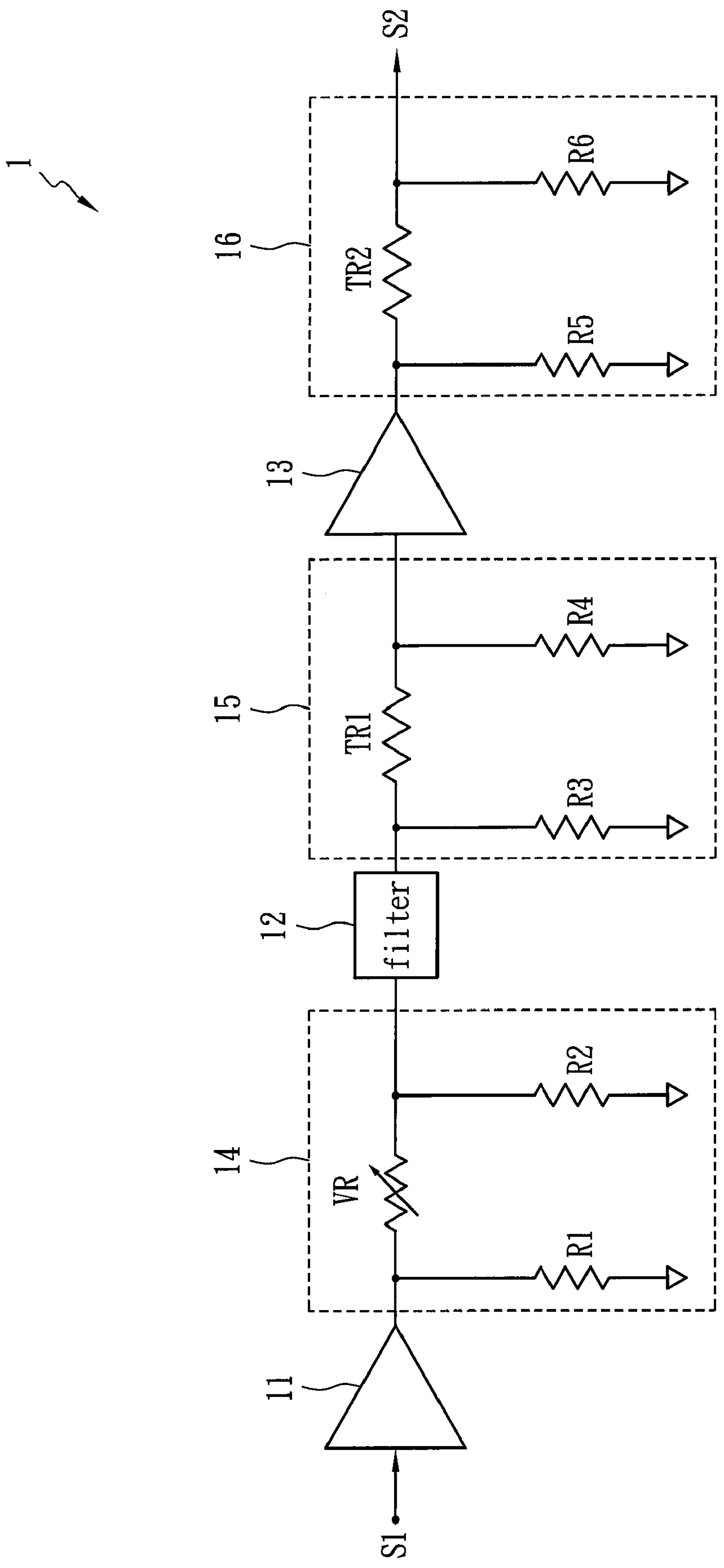
FIG. 1 shows a hint diagram of a gain compensation circuit in accordance with one embodiment of the present invention.

FIG. 1 shows a hint diagram of a gain compensation circuit 1 in accordance with one embodiment of the present invention. The gain compensation circuit 1 is applied to a microwave transceiver and includes a first amplifier 11, a gain adjuster 14, a filter 12, first attenuator 15, a second amplifier 13 and a second attenuator 16. The gain adjuster 14 is disposed between the first amplifier 11 and the filter 12 so as to adjust a nominal gain of a manufactured microwave transceiver at a normal temperature (about 25° C.) by means of a variable resistor VR. Accordingly, mass-production microwave transceivers each have the same nominal gain, and the variation of the gain relating to temperature remains the same as well. The first attenuator 15 is disposed between the filter 12 and the second amplifier 13 for providing a first gain compensation, which has a small compensation range and is used to reduce the degradation of noise figure. The second attenuator 16 is used to provide a second gain compensation, which has a larger compensation range and only slightly affects the noise figure. The first and second gain compensations keep the gain of the microwave transceiver at a constant value under different temperature conditions. The first and second attenuators 15, 16 are disposed in front of and behind the second amplifier 13, respectively, so as to reduce the degradation of return loss and noise figure of the microwave transceiver. The first and second gain compensations both exhibit a positive temperature coefficient characteristic, which means that gain increases with temperature. In this embodiment, the gain adjuster 14, the first attenuator 15 and the second attenuator 16 are π-type attenuators. The resistors R1-R6 are invariable resistors, while the thermistors TR1 and TR2 in the first and second attenuators 15, 16, respectively exhibit a negative temperature coefficient characteristic, which means that gain decreases with higher temperatures. The first amplifier 11 and the second amplifier 13 are used to compensate the gain loss due to the addition of the first and second attenuators 15, 16 and to amplify the output of the microwave transceiver. The gain variance of the first amplifier 11, the second amplifier 13 and a radio frequency carrier amplifier (not shown) which is caused by temperature variance (e.g., generally, the gain of an active amplifier is lower at high temperatures than at low temperatures) will correct the gain of the microwave transceiver through the compensation of the first and second attenuators 15, 16 so as to prevent signal distortion due to temperature variance.

Figure 2:
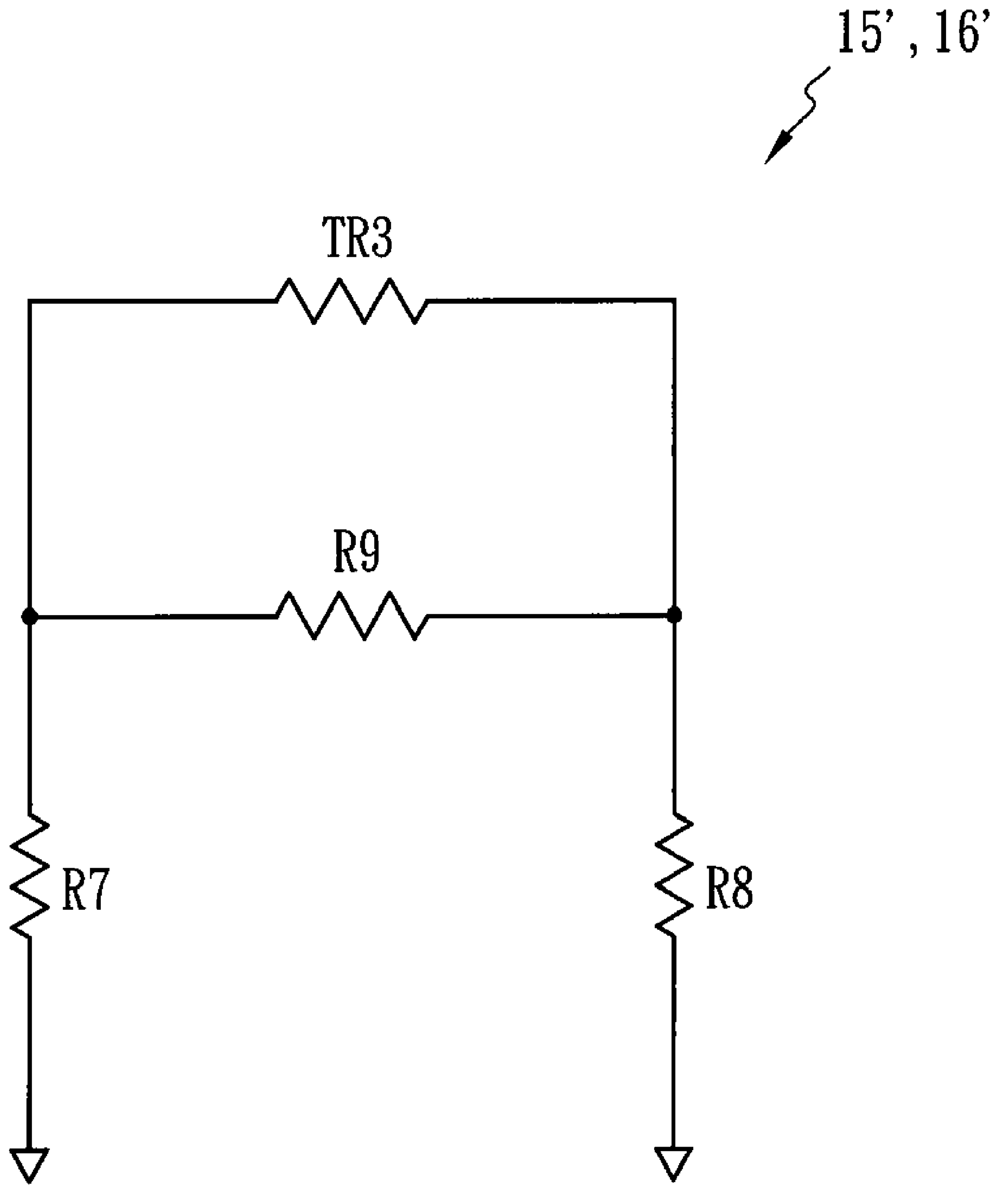
FIG. 2 shows a circuit of the first attenuator or the second attenuator according to one embodiment of the present invention.

FIG. 2 shows another circuit of the first attenuator or the second attenuator according to one embodiment of the present invention. The first attenuator 15' or the second attenuator 16' includes a thermistor TR3, two grounding resistors R7, R8 and a parallel resistor R9. The thermistor TR3 exhibits a negative temperature coefficient characteristic. The two grounding resistors R7, R8 each has an end connecting to ground and the other end connecting to the parallel resistor R9. Furthermore, the parallel resistor R9 connects to the thermistor TR3 in parallel. As the temperature increases, the resistance of the thermistor TR3, which exhibits a negative temperature coefficient characteristic, gradually decreases so as to further reduce the attenuation of the first attenuator 15' or the second attenuator 16'. As the temperature decreases, the resistance of the thermistor TR3 gradually increases so as to further increase the attenuation of the first attenuator 15' or the second attenuator 16'.

Figure 3:
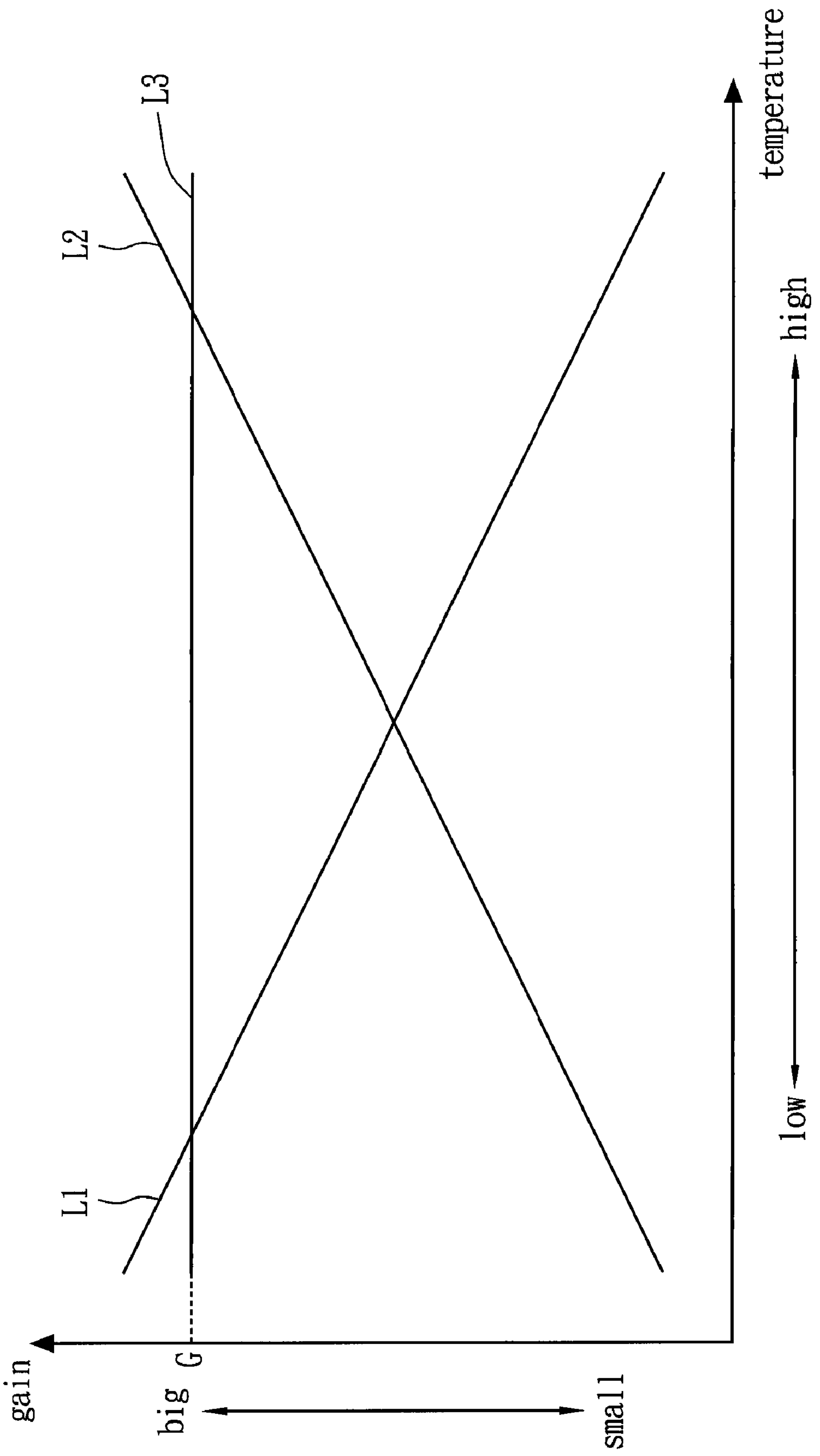
FIG. 3 shows a diagram of the gain relating to temperature.

FIG. 3 shows a diagram of the gain relating to temperature. Generally, the gain of the microwave signal transmitter or receiver is inversely proportional to temperature (as shown by line L1), while the line L2 shows a synthetical characteristic of the first and second gain compensations. The line L3 represents a constant gain G which is not affected by changes in temperature, and is created by combining the general microwave signal transmitter in FIG. 1 with the first and second attenuators 15, 16. Obviously, the slope of L2 or the amount of the constant gain G could be determined by suitably selecting resistors R3, R4 of the first attenuator 15 or resistors R5, R6 of the second attenuator 16.

Figure 4A:
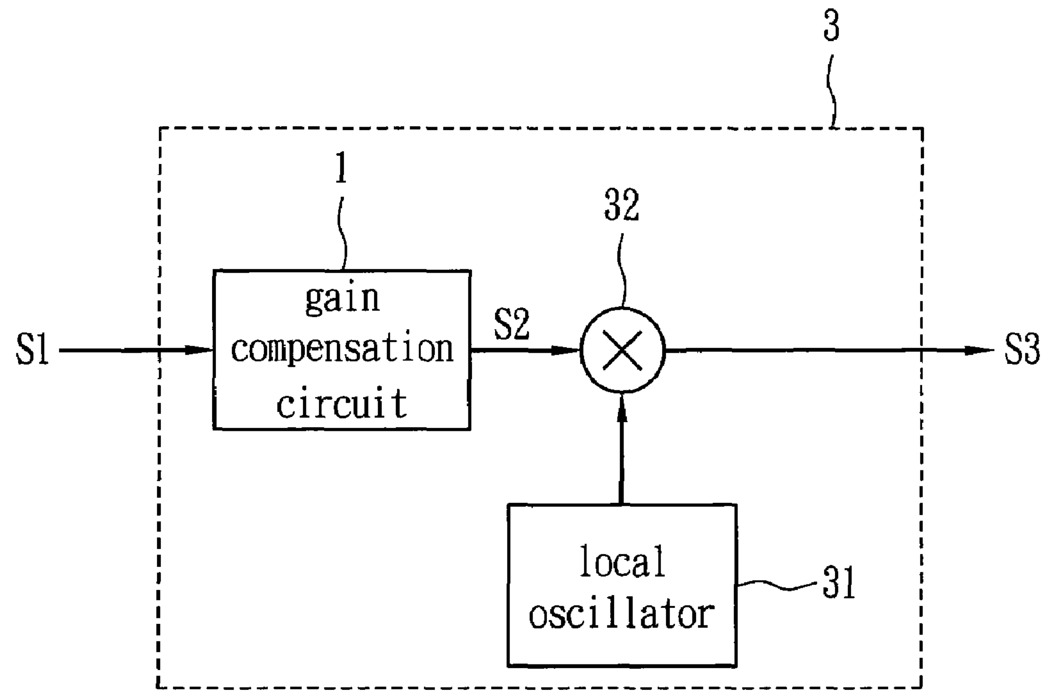
FIG. 4(*a*) exemplifies a microwave transmitter using the gain compensation circuit in accordance with one embodiment of the present invention.
Figure 4B:
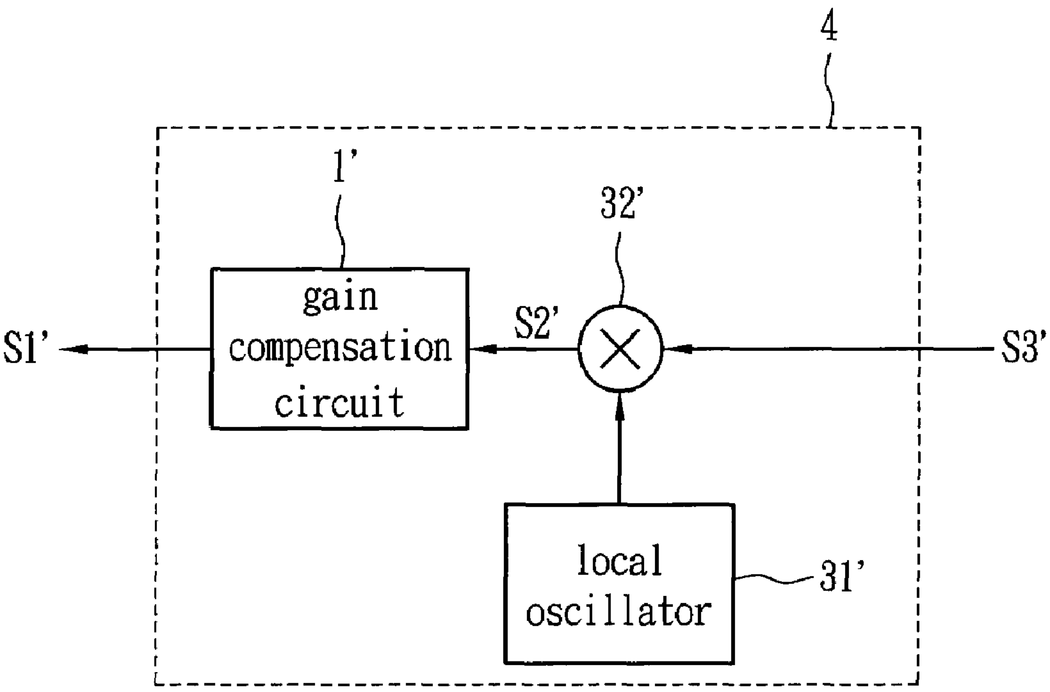

FIG. 4(*a*) shows a microwave transmitter 3 using the gain compensation circuit 1 in accordance with one embodiment of the present invention. An input signal S1 is a middle frequency at about 1 GHz, which is suitably amplified into signal S2 through the gain compensation circuit 1, but maintains its frequency unchanged. The gain compensation circuit 1 is operated in a middle frequency band. The local oscillator 31 is used to send out a frequency of about 13 GHz to the mixer 32, so as to raise the frequency of the signal S2 to 14 GHz and thus form a radio frequency output signal S3. When the microwave transmitter 3 is used outdoors, even if the temperature varies, the entire gain of the microwave transmitter 3 remains unchanged by means of the auto gain compensation of the gain compensation circuit 1. Referring to FIG. 4(*b*), the present invention can also apply to microwave receivers 4. The microwave receiver 4 receives a high frequency signal S3' at about 12 GHz. Subsequently, cooperating with a signal of about 11 GHz provided by a local oscillator 31', a mixer 32' reduces the radio frequency signal S3' into a middle frequency signal S2' of about 1 GHz. The middle frequency signal S2' goes through a gain compensation circuit 1' to be amplified and formed as a middle frequency output signal S1'. Please note that the microwave transmitter 3 in FIG. 4(*a*) and the microwave receiver 4 in FIG. 4(*b*) could both provide a constant gain within a specific temperature range. The specific temperature range and the constant gain can be obtained through suitably selecting thermal resistors (TR1 and TR2 in FIG. 1) or resistors (R1-R6 in FIG. 1).

In conclusion, the gain compensation circuit which is applied in a microwave transceiver uses two passive π-type attenuators disposed in front of and behind the second amplifier, respectively. Compared with the prior art, the present invention not only increases gain compensation range and reduces the degradation of return loss, but also improves noise figure of the microwave transceiver. In addition, the gain compensation circuit of the present invention uses an extra gain adjuster to adjust the nominal gain of the microwave transceiver so as to completely control the gain variance of the microwave transceiver.

The above-described embodiments of the present invention are intended to be illustrative only. Numerous alternative embodiments may be devised by persons skilled in the art without departing from the scope of the following claims.

What is claimed is:

1. A gain compensation circuit, applied to a microwave transceiver, the gain compensation circuit comprising:

a gain adjuster disposed between a first amplifier and a filter for adjusting a nominal gain of the microwave transceiver;

a first attenuator disposed between the filter and a second amplifier for providing a first gain compensation; and a second attenuator electrically connected to the output of the second amplifier for providing a second gain compensation;

wherein the first and second gain compensations keep the gain of the microwave transceiver at a constant value under varying temperature conditions, and the first and second attenuators are used to reduce the degradation of return loss and noise figure of the microwave transceiver.

2. The gain compensation circuit of claim 1, wherein the microwave transceiver is used outdoors.

3. The gain compensation circuit of claim 1, wherein the gain adjuster includes a variable resistor which is used to adjust the nominal gain at a normal temperature.

4. The gain compensation circuit of claim 1, wherein the microwave transceiver is a microwave transmitter.

5. The gain compensation circuit of claim 1, wherein the first and second gain compensations exhibit a positive temperature coefficient characteristic.

6. The gain compensation circuit of claim 1, wherein the first and second attenuators each comprises:

a thermistor exhibiting a negative temperature coefficient characteristic;

two grounding resistors each having an end connected to ground and the other end connected to the thermistor; and a parallel resistor connected to the other ends of the two grounding resistors.

7. The gain compensation circuit of claim 1, wherein the first and second attenuators are π-type attenuators.

8. The gain compensation circuit of claim 1, which is operated in a middle-frequency bandwidth.

* * * * *